United States Patent [19]
Ewanika et al.

[11] 3,913,557
[45] Oct. 21, 1975

[54] BARBECUE OR COOKING UNIT

[75] Inventors: Theodore Ewanika; William Walker, both of Winnipeg, Canada

[73] Assignee: Bilted Industries Ltd., Winnipeg, Canada

[22] Filed: Nov. 5, 1973

[21] Appl. No.: 412,540

[30] Foreign Application Priority Data
Jan. 23, 1973 Canada.................................. 161837

[52] U.S. Cl.................. 126/43; 126/25 A; 126/38; 126/45
[51] Int. Cl.².......................................... F24C 5/04
[58] Field of Search......... 126/38, 45, 9 R, 43, 25 R, 126/25 A, 275, 96; 99/375, 400, 446

[56] References Cited
UNITED STATES PATENTS

| 254,709 | 3/1882 | Sheldon................................. 99/446 |
| 1,351,682 | 8/1920 | Popper................................... 126/43 |
| 1,355,249 | 10/1920 | Nottingham...................... 126/25 R |
| 1,563,823 | 12/1925 | Anderson........................... 126/43 X |
| 1,725,521 | 8/1929 | Keiner............................... 126/275 R |
| 2,121,477 | 6/1938 | Dennis et al...................... 126/25 A |
| 3,244,163 | 4/1966 | McGlaughlin....................... 126/25 R |
| 3,590,726 | 3/1969 | Warner.......................... 126/25 R X |

FOREIGN PATENTS OR APPLICATIONS
| 256,083 | 10/1963 | Australia............................... 126/25 |
| 325,226 | 10/1902 | France.................................. 126/43 |

Primary Examiner—Carroll B. Dority, Jr.
Assistant Examiner—Harold Joyce
Attorney, Agent, or Firm—Stanley G. Ade

[57] ABSTRACT

A casing is supported on legs and a canister of methyl hydrate or the like soaked in an absorbent material, is situated under the casing and within the legs and acts as a source of heat. An aperture is formed in the base of said casing and the upper side of the canister is flush with the base and under the aperture. An aperture flame and heat propagating plate is situated within the casing just above the base and a grill is situated in the casing above the plate. The grill has drain troughs and spaces between the drain troughs for some fat to drip onto the plate during cooking. When lit, the plate not only radiates heat to the grill, but also reflects heat back to the canister giving a gassing effect which produces extremely high heat in a relatively short time.

4 Claims, 9 Drawing Figures

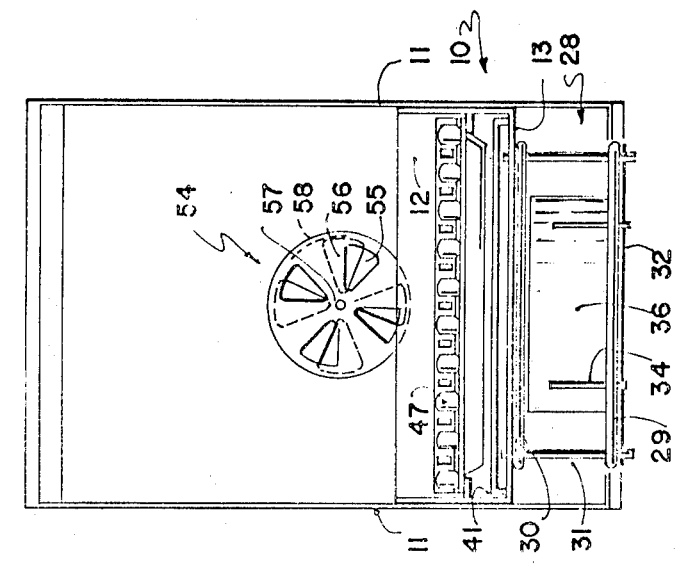
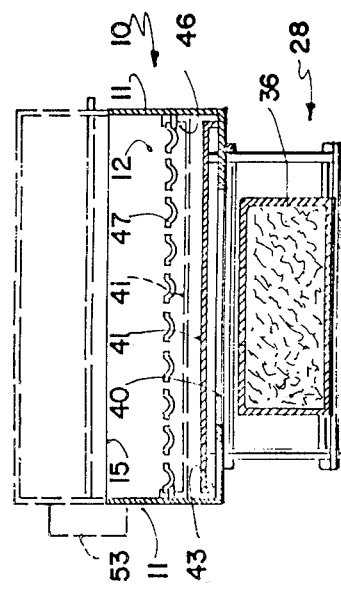
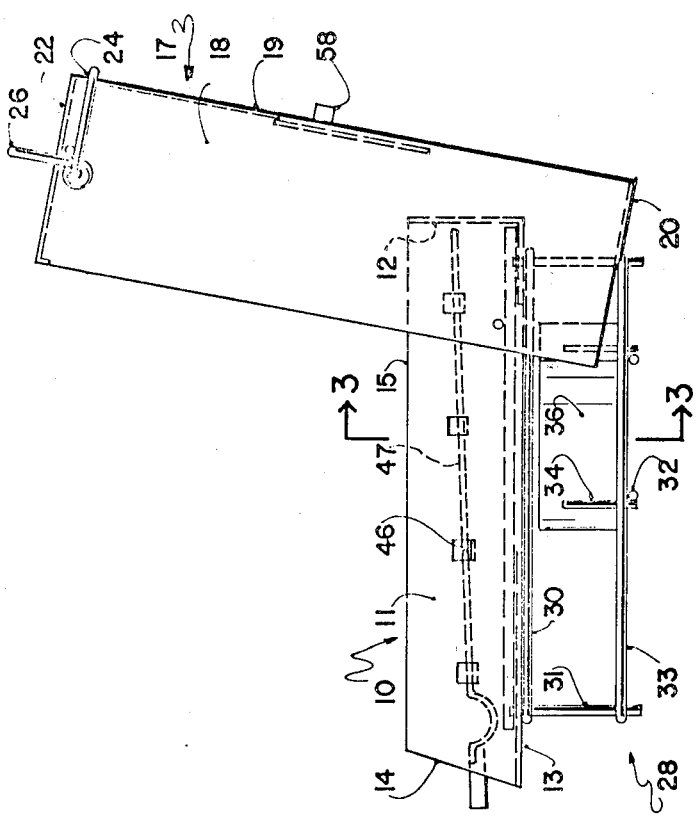
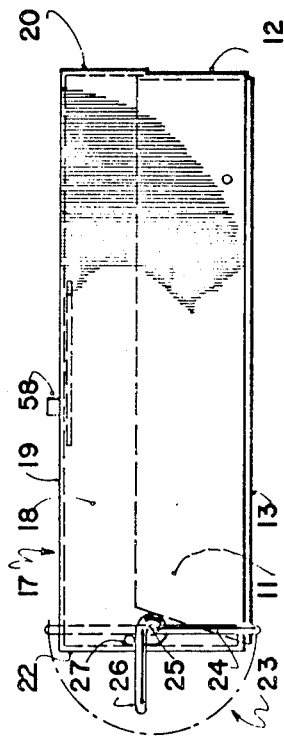

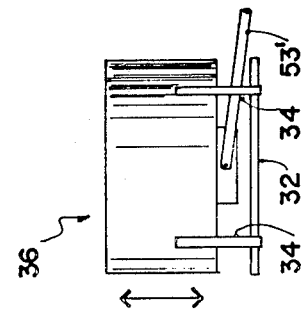
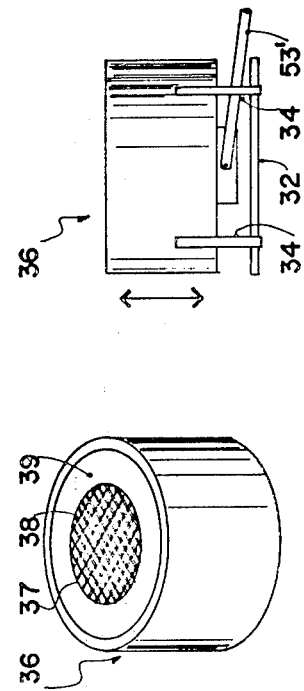
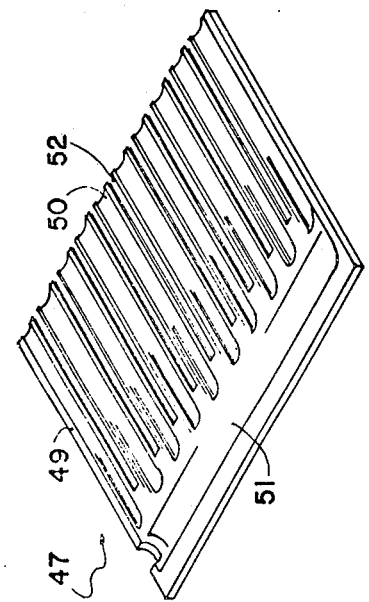
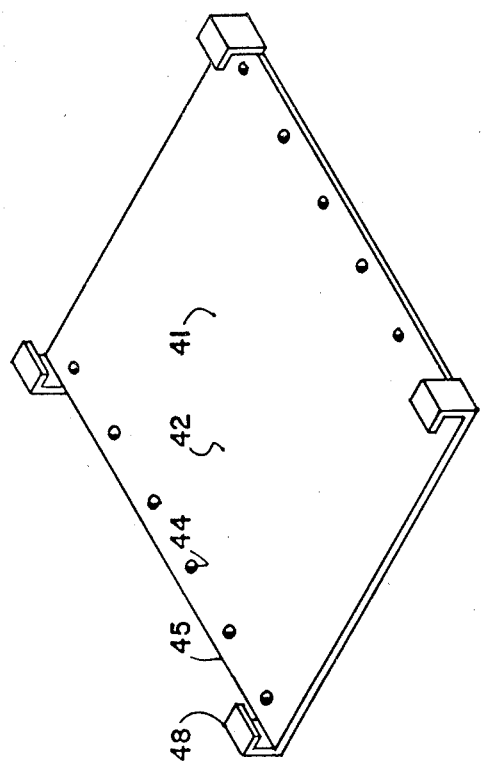
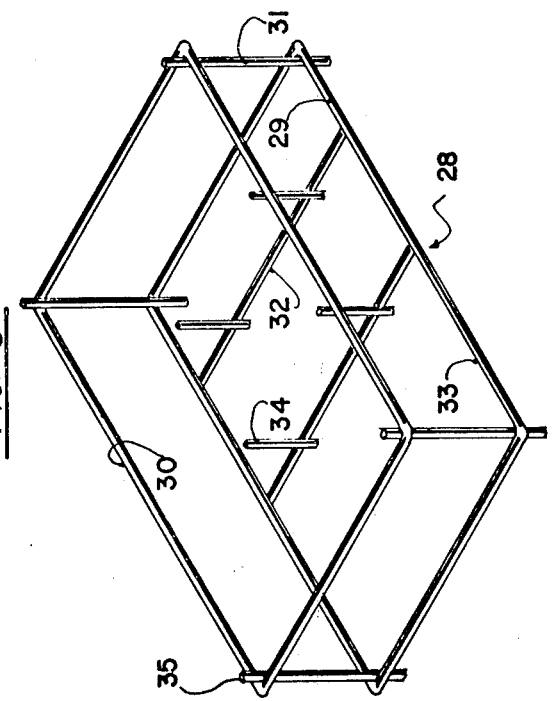

BARBECUE OR COOKING UNIT

BACKGROUND OF THE INVENTION

This invention relates to new and useful improvements in cooking devices, more specifically barbecues, but not necessarily restricted to such devices.

Conventionally, portable cooking devices such as barbecues require either a source of natural gas, or a source of heat in the form of briquettes, charcoal or the like. Sometimes wood is used as a source of heat, but this is not too satisfactory due to the difficulty in controlling heat and smoke.

Occasionally, some form of cermaics are used to store heat and radiate same, but these are relatively expensive and are not really suited for barbecues.

SUMMARY OF THE INVENTION

The present invention overcomes all of these disadvantages by utilizing a volatile fluid as a source of heat. Furthermore, a heat reflecting plate is incorporated which reflects some heat back to the volatile fluid thus increasing the evaporation rate thereof and causing a high velocity gassing effect which increases the rate of heating considerably.

One of the principal objects of the invention is therefore to provide a device of the character herewithin described in which volatile fluids such as methanol, methylated spirits, methyl alcohol and the like can be utilized and which includes means to increase the rate of heat normally associated with such fluids.

Still another object of the invention is to provide a device of the character herewithin described in which the heat within the casing can be controlled within limits.

A still further object of the invention is to provide a device of the character herewithin described which can be used as a ball-type of barbecue, or as an open frying type stove or, alternatively, as a source of heat if desired.

Still another object of the invention is to provide a device of the character herewithin described which includes a grill permitting some fat to drip through to the heat propagating plate in order to supply the conventional barbecue aroma and taste, but which at the same time collects the majority of the fat dripping from food being cooked thereon thus preventing excessive smoking and/or fire from occurring.

Still another object of the invention is to provide a device of the character herewithin described which is readily adapted for use with a spit or rotisserie.

Still another object of the invention is to provide a device of the character herewithin described which is simple in construction, economical in manufacture, and otherwise well suited for the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a side elevation of the device with the lid in the uppermost position.

FIG. 2 is a front elevation of FIG. 1.

FIG. 3 is a sectional view substantially along the lines 3—3 of FIG. 1, but with the lid removed.

FIG. 4 is a side elevation similar to FIG. 1, but with the lid in the closed position.

FIG. 5 is an isometric view of two embodiments of the heat propagating plate.

FIG. 6 is an isometric view of one type of grill used with the present device.

FIG. 7 is an isometric view of the leg or support construction.

FIG. 8 is an isometric view of the canister holding the source of heat.

FIG. 9 is an enlarged side elevation showing one method of raising or lowering the source of heat relative to the base of the barbecue.

In the drawings like characters of reference indicate corresponding parts in the different figures.

DETAILED DESCRIPTION

Before proceeding with the detailed description of the present invention, it should be understood that although the description and drawings refer to a portable barbecue, nevertheless this can be a built-in type of barbecue if desired.

In the present embodiment, a casing collectively designated 10 is provided having a pair of spaced and parallel sides 11, a rear side or panel 12 and a base 13 thus leaving the front 14 open as well as the upper side 15.

A hinged lid component collectively designated 17 is also provided having sides 18, upper panel or side 19 and rear side 20. Pivot pins 21 pivots the cover to the sides 11 of the casing adjacent the rear side 12 thereof and the cover is normally in the position shown in FIG. 1 when in the raised position.

However, when closed, it encloses the sides 11 and shuts off the open front 14 together with the open upper side 15 of the casing, it being understood that the cover 17 also includes a front transverse panel 22.

When closed as shown in FIG. 4, a handle and closure component collectively designated 23 is engaged to maintain the cover in the closed position. This consists of a U-shaped member 24 made of brass stock or the like pivotted to adjacent the front sides 18 of the cover by means of pivot pins 25.

When swung downwardly into the position shown in FIG. 4, the lower rung (not illustrated) of the U-shaped member 24 engages under the underside 13 of the casing and maintains the lid in the closed position.

When open, this U-shaped member 24 may be swung through approximately 180° and may rest upon the upper surface 19 of the lid.

Also incorporated with the closure device 23, is a handle assembly 26 and this also is comprised of a U-shaped member brass stock pivotted upon the same pins 25. A projection 27 limits the upward movement of this handle 26 which may be used for carrying the barbecue when the lid is closed, or alternatively, may be used to open and close the lid during the time the barbecue is in use.

Supporting structure collectively designated 28 is provided and, in this embodiment, takes the form of a base frame 29, and upper frame 30 and corner posts 31 extending therebetween, all of which is preferably made from round brass stock.

Transverse members 32 span the longitudinal side 33 of the base member 29 and upwardly projecting retainer pins or legs 34 secured to these cross members as clearly shown in FIG. 7. Normally, this assembly is stored within the casing for carrying purposes, but when in use, the upwardly projecting portions 35 of the posts 31 engage within corresponding apertures in the base 13 of the casing thus supporting the casing firmly thereabove as shown in FIGS. 1, 2 and 3.

A source of heat is provided and takes the form of a canister 36 having an aperture 37 in the upper side thereof. Situated within the canister, but not illustrated in an absorbent material such as cotton wool, fibreglass or the like and a wire mesh 38 covers this material that spans the aperture 37 so that it does not emerge from the aperture 37.

This canister rests within the supports or legs 34 within the base or support frame 28 with the upper side 39 substantially flush with the underside base 13 when in position as shown in FIGS. 1, 2 and 3.

The aperture 37 registers with a corresponding aperture 40 formed within the base 13 so that the aperture 37 communicates with the interior of the casing.

A heat propagating plate 41 is provided within the casing spaced just above the base 13 and in the drawings two embodiments of such a plate are shown.

In the first embodiment, illustrated in FIGS. 3 and 5, the plate consists of a substantially rectangular panel or plate 42 having downturned sides 43 which rest upon the base 13 thus spacing the plate a pre-determined distance above the base.

A plurality of flame apertures 44 are formed through the plate adjacent the longitudinal edges 45 thereof, it being understood that these longitudinal edges 45 run parallel with the side walls 11 of the casing when the flame propagating plate is in position.

A plurality of lugs 46 are offset inwardly from the sides 11 of the casing and these lugs support a grill unit collectively designated 47 and it will be noted that this grill unit is supported within the casing spaced above the plate 41.

Alternatively, upwardly and inwardly formed clips 48 are provided adjacent the corners of the flame propagating plate 42 and these may engage over the side edges 49 of the grill thus maintaining the plate suspended from the grill a given amount.

The grill unit 47 is preferably made from cast iron or the like and includes a plurality of spaced and parallel longitudinally extending fat collecting troughs 50 which communicate with a transverse main fat collecting trough 51 situated across the front of the grill unit. Longitudinally extending apertures 52 are formed through the grill between adjacent longitudinally extending troughs 50 and the aforementioned inturned lugs 46 preferably support the grill so that it slopes downwardly slightly towards the front as shown in phantom in FIG. 1. This facilitates the draining of the fat from the troughs 52 to the main trough 51.

Alternatively, of course, a conventional open wire grill may be used instead of the grill unit 47 in the event that the device is to be used for heating cooking utensils.

Also, the depth of the sides 11 may be made sufficient to support a conventional rotisserie assembly collectively designated 53 and shown in phantom in FIG. 3. However, such structure is well-known so that it is not believed necessary to describe same further.

In operation, the container 36 is filled with a volatile heating fluid such as methanol, methylated spirits or methyl hydrate or the like which is soaked up by the absorbent material within the container.

When it is placed in the position under the base and in alignment with the apertures 40, the flame from the aperture 37 impinges upon the heat propagating plate 41 situated thereabove. This plate not only radiates heat upwardly to the underside of the grill component 47, but also reflects heat back to the aperture 37. This increases the evaporating rate of the fluid considerably so that a gassing effect is produced with an extremely high heat build up. Due to the increased evaporating rate, a semi-refrigerating effect is encountered by the container 36 relative to the ambient temperature so that any danger is eliminated.

With the gassing effect hereinbefore described, the flame spreads across the underside of plate 41 and up through the apertures 44. The increased heat, of course, rapidly heats up the grill 47 to cooking temperature and meat placed thereon has the fat collected by the troughs 52. However, some fat drips through the apertures 52 onto the hot plate 42 thus giving the necessary smoke for barbecue aroma and flavour.

Two methods are provided to control the heat within the casing and FIG. 9 shows the first method. This is a simple lever action 53 pivotted on one of the legs 34 so that the container may be raised or lowered relative to the aperture 40.

Secondly and more important method is a control damper collectively designated 54 provided in the upper panel 19 of cover. It consists of a plurality of apertures 55 formed in the cover and a circular plate 56 pivotted upon pin 57 and having corresponding apertures therein. By rotating this plate apertures 55 may be opened and closed relative to the plate 56. In this regard an upturned flange 58 is provided to facilitate the rotation of plate 56.

When used as a ball type barbecue, the fully enclosed casing gives reflected heat from all sides and when used as an open type cooking unit, cooking utensils such as frying pans, sauce pans can be placed upon a wire grate (not illustrated) which may be substituted for a grill unit 47.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A cooking unit such as a barbecue and the like comprising in combination a casing having an apertured base, a pair of sides and a rear panel and means to support said casing, a cover for said casing closing off the upper and front side of said casing when closed, a source of heat under said casing and aligned with the aperture in said base, a heat propagating plate, said plate within said casing and spanning same, a cooking grill in said casing above said heat propagating plate, said grill being apertured whereby fat may be dripped through said grill onto said heat propagating plate, said heat propagating plate being apertured adjacent the perimetrical edges thereof whereby flames may pass through said plate and impinge upon the underside of said grill, said heat propagating plate being supported upon the underside of said grill, said source of heat including a container, absorbent means in said container, and a volatile heating fluid in said container, said container being situated below said heat propagating plate and in close proximity therewith whereby said heat propagating plate reflects back heat directly onto said container thereby increasing the rate of evaporation of said volatile fluid.

2. The device according to claim 1 which includes means to control the position of said source of heat relative to said heat propagating plate, within limits.

3. The device according to claim 2 in which said source of heat is spaced from the perimetrical edges of said base that define the aperture therein.

4. The device according to claim 2 in which said source of heat is spaced from the perimetrical edges of said base that define the aperture therein.

* * * * *